United States Patent [19]

Minke

[11] 3,866,792
[45] Feb. 18, 1975

[54] INTEGRAL FILAMENT REINFORCED COMPOSITE-ROCKET CHAMBER/ADAPTER

[75] Inventor: Charles M. Minke, Cumberland, Md.

[73] Assignee: Hercules Incorporated, Wilmington, Del.

[22] Filed: Mar. 2, 1973

[21] Appl. No.: 337,351

[52] U.S. Cl. .................... 220/72, 220/83, 156/175, 156/182, 60/200 A
[51] Int. Cl. .......................... B65d 7/42, F02k 9/00
[58] Field of Search .......... 60/200 A; 220/3, 83, 59, 220/69, 70–72; 156/169–173, 175, 182

[56] References Cited
UNITED STATES PATENTS

| | | | |
|---|---|---|---|
| 3,074,585 | 1/1963 | Koontz | 60/200 A |
| 3,083,864 | 4/1963 | Young | 60/200 A |
| 3,112,234 | 11/1963 | Krupp | 156/169 |
| 3,172,252 | 3/1965 | Boek | 220/3 X |
| 3,282,757 | 11/1966 | Brussee | 220/3 UX |
| 3,293,860 | 12/1966 | Stedfeld | 220/3 X |
| 3,553,045 | 1/1971 | Heh | 156/173 X |
| 3,573,123 | 3/1971 | Siegel et al. | 156/171 |

OTHER PUBLICATIONS

"Filament Winding Conference," Society of Aerospace Engineers, Mar. 28–30, 1961; pp. 150, 151, 219.
Rolston, J. A., "Air Force Basis Research in High Performance Filament Composites," USAF Office of Aerospace Research, Sept., 1967, pp. 1–6.
Galasso, F. S., "High Modulus Fibers and Composites," Gordon & Breach Pub., N.Y., 1969; pp. 4–16.

Primary Examiner—Carlton R. Croyle
Assistant Examiner—Robert E. Garrett
Attorney, Agent, or Firm—James W. Peterson

[57] ABSTRACT

The invention is a high pressure, lightweight integral filament reinforced composite chamber/adapter. The polar opening of a helically wound chamber is integrally reinforced by means of a plurality of mats formed of a high modulus filament. The mats are interspersed between the normal helical windings proximate the polar opening to form a dimensionally stable adapter surface for the attachment of chamber accessories.

2 Claims, 5 Drawing Figures

INTEGRAL FILAMENT REINFORCED COMPOSITE-ROCKET CHAMBER/ADAPTER

BACKGROUND OF THE INVENTION

This invention applies to the problem of attaching accessories to the polar openings of composite filament wound cylindrical pressure vessels. The chamber/adapter of the instant invention was specifically developed for use on solid propellant rocket motor chambers to provide a performance improvement by eliminating the conventional metal adapter and thus reduce weight, cost and manufacturing time.

An inherent feature of a filament would pressure vessel is at least one polar opening at the end of the vessel. This opening is almost universally required in a rocket motor chamber to provide access and attachment of chamber accessories such as the nozzle at the aft-end and/or the igniter at the forward-end.

Providing means of attachment to any composite structure is a difficult structural problem. The way attachment to the pressure vessel has been accomplished in the past is through a separate metal flange collar commonly called an adapter which transfers the attachment load.

Previous attempts to provide an integral filament reinforced composite chamber/adapter have been with glass fiber which will stretch under tension caused by the high pressure in the chamber. The undesirable stretching prevents the dimensional stability required for mounting accessories. Metal end pieces have been necessary to provide dimensionally stable attachment points. With the advent of high modulus fibers such as graphite fibers, "KELVAR-49" and boron fibers which do not stretch due to their high modulus of elasticity (a modulus of 20,000,000 to 60,000,000 as compared with glass fiber having a modulus of approximately 12,000,000) it became possible to eliminate metal polar adapters as will be disclosed by this invention.

This invention, an integral chamber/adapter, eliminates the conventional adapter, thus reducing weight, providing more usable space envelope, increasing reliability and shortening manufacturing time since the metal adapters are often made from expensive, long lead time, high quality forgings.

OBJECTS OF THE INVENTION

It is a primary object of the instant invention to provide an integral filament reinforced chamber adapter. It is another object of this invention to provide a means of attachment to the polar openings of composite filament wound high pressure vessels where lightweight is a major consideration.

It is a further object of the instant invention to provide a dimensionally stable attachment means for fiberglass high pressure vessels.

It is yet another object of the instant invention to provide a dimensionally stable attachment for a high modulus fiber reinforced high pressure vessel.

SUMMARY OF THE INVENTION

It is a purpose of the instant invention to provide a dimensionally stable, integral filament reinforced composite chamber/adapter. The chamber/adapter of the instant invention employs a graphite reinforced section which gives the strength and dimensional stability required for use as a high pressure filament reinforced composite chamber.

DESCRIPTION OF THE INVENTION

DESCRIPTION OF THE PREFERRED EMBODIMENT

Figure 1:
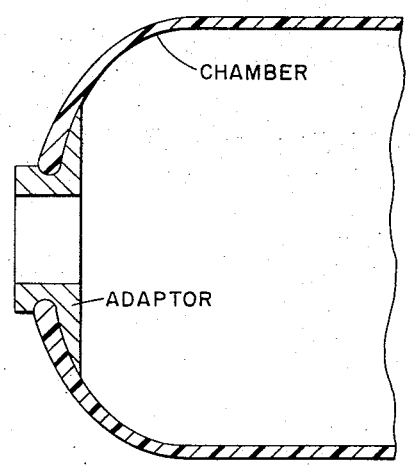
FIG. 1 shows a partial view of a conventional filament wound chamber in section utilizing a separate metal adapter.

With continued reference to the drawing FIG. 1 shows the conventional means for providing an attachment to a composite structure. Specifically, the figure shows the use of a flanged collar, commonly called an adapter, which transfers the attachment load to the pressure vessel.

Figure 2:
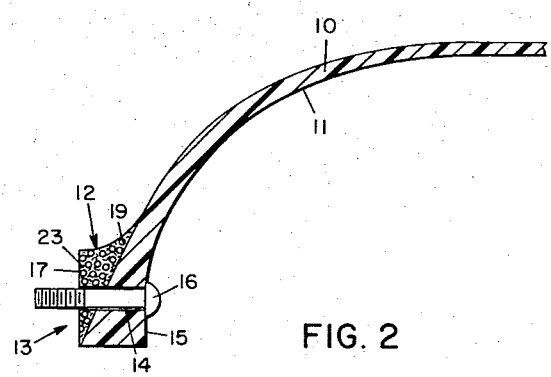
FIG. 2 shows a partial view in section of the polar end of an integral filament reinforced composite chamber/adapter.

FIG. 2 shows a detailed drawing of a typical layup of an integral filament reinforced composite chamber/adapter. Specifically, the figure shows a portion of a polar end of a filament wound composite pressure vessel which is a cylindrical tube with an ovaloid end closure fabricated with a continuous filament of structural material (in this embodiment graphite fiber).

Helical windings 10 provide a structural shell for the dome 11 and the major structure for the adapter area referred to generally at 13. The inner contour 15 is flattened in the adapter area 13 by additional composite material to provide a reinforced load bearing surface for the bolt 16. The outboard face 17 is also contoured to provide the proper configuration for mating surfaces and seals. Build-up material 12 to accomplish the modification of the adapter geometry is integral with the normal helical windings to provide the maximum strength. The built-up area 12 consists of hoop windings 19 of graphite fiber and build-up material of chopped graphite fiber 23 to provide a flat face which can be machined to desired configuration.

An opening 14 can be provided through the integral chamber/adapter by either drilling the final chamber or by winding the chamber originally around removable pins (not shown) to avoid stress concentrations. Bolts or other attaching means 16 are inserted through opening 14 for purposes of attachment of auxiliary apparatus to the chamber. It would be within the scope of the invention to wind and embed the attaching means within a portion of the windings.

Figure 3:
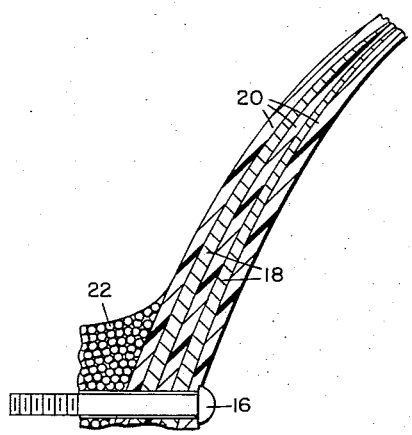
FIG. 3 shows a partial view in section of the polar end of an optional construction of an integral filament reinforced composite chamber/adapter for a conventional glass wound high pressure vessel.

FIG. 3 shows an alternate embodiment of the instant invention to provide a dimensionally stable attachment area for a conventional glass wound high pressure vessel. Interspaced between the normal helical windings of glass 20 there are inserted a plurality of graphite mats 18 to strengthen the polar region. Additional hoop windings of graphite fibers are shown at 22. The graphite mats are made from graphite fiber and resin.

Figure 4:
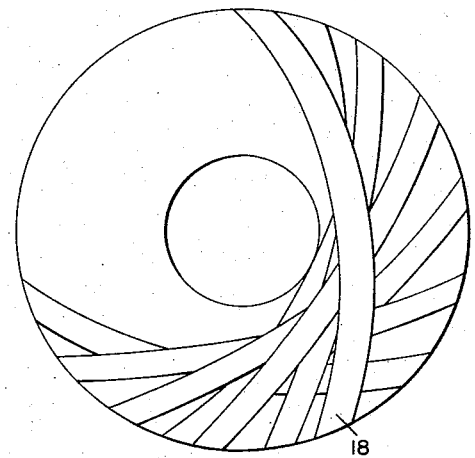
FIG. 4 shows a graphite mat that may be used in the construction of the integral chamber/adapter shown in FIG. 2.

FIG. 4 shows one type of graphite mat in which graphite tape having graphite fibers running lengthwise is laid in a series of strips to fashion a mat. The interspacing of the graphite mats with the conventional helical glass windings provides an attachment point which is dimensionally stable.

Figure 5:
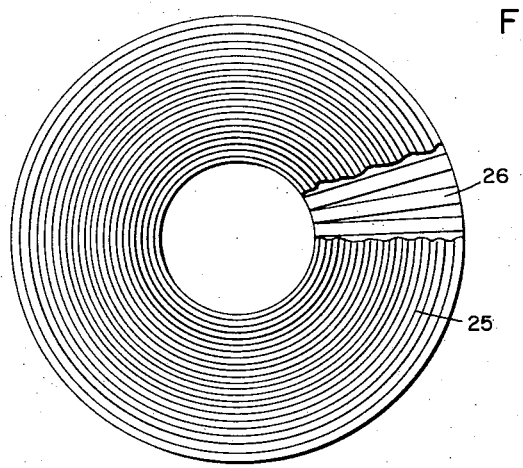
FIG. 5 shows an alternate mat construction in partial section.

FIG. 5 shows an alternate mat construction comprising a layer of spiral hoop windings 25 of carbon fiber faced with glass fiber tape 26 oriented in a radial direction.

It can be seen that the instant invention provides a dimensionally stable adapter for use in high pressure vessels where lightweight is a major consideration. Weight is a critical parameter in aeronautical and astronautical vehicles having a value ranging up to hundreds and thousands of dollars per lb. This invention results in a weight reduction in a typical rocket motor chamber of 50% of the weight of the conventional polar adapter which results in an increased performance either in terms of velocity, range, or additional payloads.

It is understood that the invention is not limited to the precise construction shown, but the changes are contemplated as readily fall within the spirit of the invention as shall be determined by the scope of the appended claims.

What is claimed is:

1. A lightweight, high pressure, integral filament reinforced composite chamber/adapter comprising:
    a. a filament wound chamber having an interior cavity, an exterior surface, and at least one polar opening extending from the interior cavity to the exterior surface of said chamber, said chamber comprising helical windings of glass filament, and
    b. a filament reinforced composite adapter integral with said chamber, said adapter comprising a plurality of mats interspaced between the helical windings of glass, said mats comprising a plurality of spirally hoop wound high modulus filaments faced with glass fiber tapes extending radially outwardly from said polar opening, said filaments having a modulus of elasticity of at least $20 \times 10^6$ pounds per square inch, said spirally hoop wound filaments extending outwardly from said polar opening, said glass filament windings and said mats providing a dimensionally stable adapter surface for attachment of chamber accessories.

2. A lightweight, high pressure, integral filament reinforced composite chamber/adapter comprising:
    a. a filament wound chamber having an interior cavity, an exterior surface, and at least one polar opening extending from the interior cavity to said exterior surface of said chamber, said chamber comprising helical windings of glass filaments, and
    b. a filament reinforced composite adapter integral with said chamber, said adapter comprising a plurality of graphite fiber mats extending around said polar opening, and interspaced between said helical windings of glass, said graphite fiber mat comprising a plurality of discrete overlapping graphite fiber tapes, said glass windings and said graphite fiber mats interspaced between said windings comprising the adapter and providing a dimensionally stable adapter surface for the attachment of chamber accessories.

* * * * *